United States Patent Office 2,847,878
Patented Aug. 19, 1958

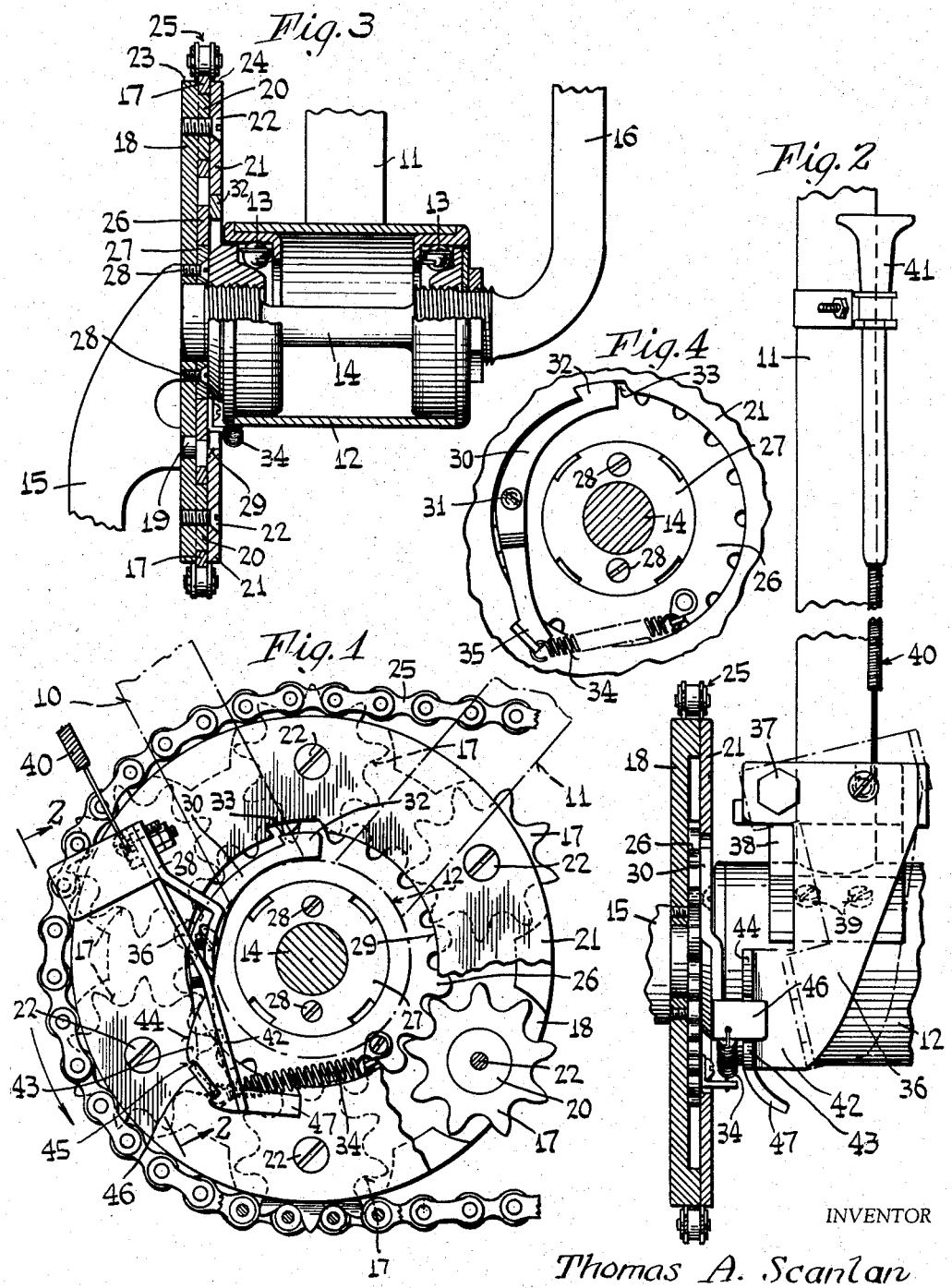

2,847,878

MULTISPEED BICYCLE DRIVE

Thomas A. Scanlan, Cornwall-on-Hudson, N. Y.

Application January 12, 1954, Serial No. 403,618

6 Claims. (Cl. 74—781)

This invention relates to multispeed drives for bicycles and the like.

An object of the invention is to provide an improved two-speed, chain drive for a bicycle, which is simple in construction and economical to produce, and is rugged and reliable in operation at all times.

Another object of the invention is to provide an improved two-speed, chain drive for a bicycle in accordance with the above, which has relatively few, easily produced parts.

A further object of the invention is to provide an improved two-speed bicycle drive according to the foregoing which is extremely compact and small in size, requiring but little more space than the ordinary driving sprocket of the bicycle.

Yet another object of the invention is to provide an improved two-speed bicycle drive as above set forth, which may be readily incorporated in existing bicycles without requiring any appreciable changes or alterations in the frame and other structures.

Other features and advantages will hereinafter appear.

In the accompanying drawings:

Figure 1 is a side elevational view of the drive mechanism of the invention, portions being broken away to reveal the interior construction.

Fig. 2 is a view partly in section and partly in elevation of the structure of Fig. 1, showing also the operating handle of the device, the sectional portion being taken on line 2—2 of Fig. 1.

Fig. 3 is an axial vertical sectional view of the two-speed drive.

Fig. 4 is a fragmentary elevational view of the two-speed drive, showing in more detail a releasable locking means employed to obtain low speed.

Referring to Figs. 1, 2 and 3, the bicycle frame is shown as comprising the usual tubular, divergent frame members 10 and 11 joined at their lower extremities to a cylindrical bearing housing 12 having ball bearings 13 rotatably mounting a pedal shaft 14 which has the usual pedal arms 15 and 16.

In accordance with the present invention, adjacent the pedal arm 15 there is provided a plurality of flat, spaced-apart sprocket wheels 17 lying in a single plane which is normal to the axis of the pedal shaft. The sprocket wheels 17 are disposed in a circle about the pedal shaft 14 and are carried by a plurality of bearings comprising a circuit carrier plate 18 mounted on the pedal shaft 14 and keyed thereto by a pin connection 19. The carrier plate 18 has bosses 20 constituting bearings for the sprocket wheels 17, and an annular, flat plate 21 is provided, secured to the bosses 20 by screws 22 in order to retain the sprocket wheels 17 in the desired positions.

The outer peripheries 23 and 24 of the plates 18 and 21 respectively are flush or coextensive with each other to provide a bearing surface for a sprocket chain 25, and the sprocket wheels 17 are so arranged with respect to the plates 18 and 21 that their teeth project substantially beyond the peripheries 23 and 24 of the plates for driving, seriatim engagement with the chain 25.

Disposed within the area bounded by the sprocket wheels 17 and against the inner surface of the carrier plate 18 is a gear 26 rotatable about a circular bearing plate 27 fastened to the carrier plate 18 by screws 28. The gear 26 meshes with the sprocket wheels 17, and the annular plate 21 has an inner circular periphery 29 which is of smaller diameter than the maximum diameter of the gear, thereby to retain said gear on the bearing plate 27. The gear 26 is, by the above construction, rotatable with respect to the pedal shaft 14.

In accordance with the invention a releasable locking means is provided, hereinafter termed a first-locking means, between the gear 26 and the pedal shaft 14. This first-locking means comprises a locking lever 30 carried on the gear 26 by means of a pivot stud 31, Fig. 4. At one extremity the locking lever 30 has a projecting portion 32 receivable in a locking slot 33 provided in the inner periphery 29 of the annular plate 21, and by this construction the gear 26 may be locked against movement with respect to the plates 21 and 18 and the pedal shaft 14. The locking lever 30 is normally urged to its locking position by a helical extension spring 34 secured at one end to the gear 26 and at the other end to the opposite extremity 35 of the lever 30. When the lever 30 is in its locking position as shown in Fig. 4, wherein it locks the gear 26 to the pedal shaft 14, no turning movement is permitted of the sprocket wheels 17 with respect to their bearings or, for that matter, the entire assemblage, including the pedal shaft 14. For this condition, since the sprocket wheels 17 remain stationary in the assemblage, turning of the pedal shaft 14 will drive the chain 25 in the manner of an ordinary sprocket wheel. The teeth of the various sprocket wheels will at all times be properly positioned to mesh with the chain 25 and therefore a direct drive is established between the pedal shaft 14 and the sprocket wheels 17 and chain 25. This direct drive, as disclosed herein, is the low-speed drive of the device.

For the purpose of providing a high-speed drive between the pedal shaft 14 and the sprocket chain 25, the gear 26 is released from the annular plate 21 and is locked against turning with respect to the bicycle frame and the bearing housing 12 by a second releasable locking means. This second-locking means includes a pivoted catch 36 mounted by means of a pivot bolt 37 on a bracket 38 which is secured to the bearing housing 12 by cap screws 39. The catch 36 is actuated by a Bowden wire 40 terminating in a shift button or handle 41 mounted on the bicycle frame member 11.

As shown in Figs. 1 and 2, the catch 36 is in the form of a bell crank, having a lower extremity 42 provided with a flange 43 shaped to have a camming edge 44 and a locking notch 45. Cooperable with the camming edge 44 and the locking notch 45 is a tab or projection 46 extending laterally from the extremity 35 of the locking lever 30 carried by the gear 26. During rotation of the gear 26 in a counterclockwise direction, indicated by the arrow in Fig. 1, if the catch 36 should be in the full line position shown in Fig. 2, the tab or projection 46 of the locking lever 30 will ride up on the camming surface 44 of the catch and will be held captive in the locking notch 45. At the same time the extremity 32 of the locking lever 30 will be disengaged from the annular plate 21, thereby releasing the gear 26 from the plate. With the gear 26 held stationary with respect to the bicycle frame and bearing housing 12, rotation of the pedal shaft 14 and plates 18 and 21 carried thereby will cause the sprocket wheels 17 to turn and travel around the periphery of the gear 26, being driven by the gear. In so doing, the sprocket wheels will advance the sprocket chain 25 faster than if the sprocket wheels remained stationary in the assemblage. Therefore a faster speed or drive is obtained when the gear 26 is locked against turning.

When the device is set for high speed, the sprocket chain 25 will ride along and slide on the peripheries 23 and 24 of the plates 18 and 21. To release the gear 26 or shift back into low speed, it is merely necessary to pull on the shift button 41. This will swing the catch 36 to the broken line position shown in Fig. 2, releasing the tab 46 and allowing the return spring 34 to again shift the locking lever 30 to the locking position shown in Fig. 4, wherein the gear is again fixed to the annular plate 21.

The catch 36 is provided with a curved tab 47 on the extremity 42 thereof, said tab being positioned for engagement by the tab 46 of the lever 30 whenever the pedal shaft 14 is rotated in a reverse direction, that is, clockwise as viewed in Fig. 1, while the shifting control including the catch 36 is in the high-speed position shown in Fig. 2. Such engagement will swing the catch 36 counterclockwise as viewed in Fig. 2 and provide clearance for the passage of the tab 46 of the locking lever without damaging the mechanism.

The two-speed drive of this invention, as described above, is seen to be extremely compact and small in size, simple and rugged in its construction and reliable in operation. The components which experience the greatest stress are so arranged as to be able to readily withstand excess loads without failure. The device may be readily applied to existing bicycles, requiring only the installation of the shift control, including attachment of the bracket 38 to the bearing housing 12 of the bicycle.

Variations and modifications may be made within the scope of the claims and portions of the improvements may be used without others.

I claim:

1. A multispeed drive for a bicycle or the like, comprising a frame member; a pedal shaft rotatable in the frame member; a gear rotatable about said pedal shaft; a plurality of spaced-apart wheels disposed in a circle around the periphery of said gear and meshing therewith; a plurality of bearing means for said wheels, fixed to and rotatably movable with the pedal shaft, said bearing means positioning said wheels for driving engagement with a sprocket drive means; a first releasable means for immovably locking said gear to said bearing means for simultaneous rotatable movement therewith, thereby to hold the sprocket wheels against movement about said bearing means and with respect to said gear; means operable to release said locking means; a second releasable means operable alternatively with said first releasable means, for locking the said gear to the said frame member against turning movement in opposite directions; and means, including a manually-operable handle, dependent for operation upon rotation of the said gear for operating the second-locking means to lock the gear to the frame member and for simultaneously operating the first-locking means to release the gear from the said bearing means.

2. The invention as defined in claim 1 in which the means including the manually-operable handle comprises a catch movably mounted on said frame member and comprises a locking member movably mounted on said gear and alternatively engageable with said catch and said bearing means.

3. A multispeed drive for a bicycle or the like, comprising a frame member; a pedal shaft rotatable in the frame member; a gear rotatable about said pedal shaft; a plurality of spaced-apart wheels disposed in a circle around the periphery of said gear and meshing therewith; a plurality of bearing means for said wheels, fixed to and rotatably movable with the pedal shaft, said bearing means positioning said wheels for driving engagement with a sprocket drive means; a first releasable means for immovably locking said gear to said bearing means for simultaneous rotatable movement therewith, thereby to hold the sprocket wheels against movement about said bearing means and with respect to said gear; means operable to release said locking means; and a second releasable means operable alternatively with said first releasable means, for locking the said gear to the said frame member against turning movement in opposite directions, said bearing means including an annular plate extending along corresponding sides of the gear and wheels, said plate having an inner periphery provided with a locking notch, the first-locking means comprising a member carried by the gear and engageable in said notch to lock the gear to the bearing means.

4. A multispeed drive for a bicycle or the like, comprising a frame member; a pedal shaft rotatable in the frame member; a gear rotatable about said pedal shaft; a plurality of spaced-apart wheels disposed in a circle around the periphery of said gear and meshing therewith; a plurality of bearing means for said wheels, fixed to and rotatably movable with the pedal shaft, said bearing means positioning said wheels for driving engagement with a sprocket drive means; a first releasable means for immovably locking said gear to said bearing means for simultaneous rotatable movement therewith, thereby to hold the sprocket wheels against movement about said bearing means and with respect to said gear; means operable to release said locking means; and a second releasable means operable alternatively with said first releasable means, for locking the said gear to the said frame member against turning movement in opposite directions, said second releasable means including a catch movably mounted on the frame member, having a camming surface and a locking notch, the first-locking means including a locking member movably mounted on the gear, adapted to ride up on the camming surface and lock in the said notch of the catch when the gear is being turned.

5. A multispeed drive for a bicycle or the like, comprising a frame member; a pedal shaft rotatable in the frame member; a gear rotatable about said pedal shaft; a plurality of spaced-apart wheels disposed in a circle around the periphery of said gear and meshing therewith; a plurality of bearing means for said wheels, fixed to and rotatably movable with the pedal shaft, said bearing means positioning said wheels for driving engagement with a sprocket drive means; a first releasable means for immovably locking said gear to said bearing means for simultaneous rotatable movement therewith, thereby to hold the sprocket wheels against movement about said bearing means and with respect to said gear; means operable to release said locking means; and a second releasable means operable alternatively with said first releasable means, for locking the said gear to the said frame member against turning movement in opposite directions, said first releasable means including a lever pivotally mounted on the gear and interlockingly engageable with the bearing means, said lever having a projection extending laterally from the gear, the second releasable means including said projection and locking lever and including a catch pivotally mounted on the frame member, having a camming surface and a locking notch shiftable into the path of movement of the projection of said locking member during turning of said gear, said projection riding up on said camming surface and into said locking notch and being held captive in said notch to lock the gear against turning in opposite directions.

6. A multispeed drive for a bicycle or the like, comprising a frame member; a pedal shaft rotatable in the frame member; a gear rotatable about said pedal shaft; a plurality of spaced-apart wheels disposed in a circle around the periphery of said gear and meshing therewith; a plurality of bearing means for said wheels, fixed to and rotatably movable with the pedal shaft, said bearing means positioning said wheels for driving engagement with a sprocket drive means; a first releasable means for immovably locking said gear to said bearing means for simultaneous rotatable movement therewith, thereby to hold the sprocket wheels against movement about said bearing means and with respect to said gear; means operable to release said locking means; and a second releasable means operable alternatively with said first releasable means, for locking the said gear to the said frame member against turning movement in opposite directions, the bearing means including a pair of spaced circular plates disposed on opposite sides of and engaging the said gear and wheels, one of said plates having a central opening, the first-locking means including a flat member movably mounted on said gear, disposed within the said central opening of the one plate and in the plane of said one plate.

References Cited in the file of this patent

UNITED STATES PATENTS

| 530,103 | Grueter et al. | Dec. 4, 1894 |
| 1,234,572 | Runner | July 24, 1917 |

FOREIGN PATENTS

| 29,743 | France | June 16, 1925 |
| | (Addition to No. 585,618) | |
| . 143 | Great Britain | Jan. 4, 1897 |
| 6,700 | Great Britain | of 1896 |
| 23,231 | Great Britain | Oct. 28, 1904 |
| 239,863 | Great Britain | Nov. 19, 1925 |
| 107,272 | Sweden | Apr. 27, 1943 |